United States Patent
Doelker

(10) Patent No.: US 6,873,941 B2
(45) Date of Patent: Mar. 29, 2005

(54) SPEED FILTER

(75) Inventor: Armin Doelker, Immenstaad (DE)

(73) Assignee: MTU Friedrichshafen GmbH, Friedrichshafen (DE)

( * ) Notice: Subject to any disclaimer, the term of this patent is extended or adjusted under 35 U.S.C. 154(b) by 0 days.

(21) Appl. No.: 10/475,664

(22) PCT Filed: May 4, 2002

(86) PCT No.: PCT/EP02/04922

§ 371 (c)(1),
(2), (4) Date: May 11, 2004

(87) PCT Pub. No.: WO02/090998

PCT Pub. Date: Nov. 14, 2002

(65) Prior Publication Data

US 2004/0181353 A1 Sep. 16, 2004

(30) Foreign Application Priority Data

May 9, 2001 (DE) .......................... 101 22 517

(51) Int. Cl.⁷ .............................. G06F 19/00
(52) U.S. Cl. ........................ 702/190; 73/494
(58) Field of Search .................. 702/190, 34, 42, 702/43, 96, 142, 145, 182; 73/650, 856.59, 862.328, 862.329, 862.41, 494, 496, 514.29, 514.34

(56) References Cited

U.S. PATENT DOCUMENTS

| | | | |
|---|---|---|---|
| 5,967,117 A | 10/1999 | Wenzlawski et al. | 123/339.1 |
| 6,019,086 A * | 2/2000 | Schneider et al. | 123/406.61 |
| 6,021,758 A | 2/2000 | Carey et al. | 123/436 |
| 6,158,273 A | 12/2000 | Jeremiasson et al. | 73/117.3 |
| 6,283,390 B1 * | 9/2001 | Brendle et al. | 239/533.2 |
| 6,711,944 B2 * | 3/2004 | Maruta et al. | 73/116 |

FOREIGN PATENT DOCUMENTS

| | | |
|---|---|---|
| EP | 0059585 B1 | 4/1989 |
| EP | 0429819 A1 | 10/1990 |
| GB | 2134265 A | 8/1984 |
| WO | WO 99/08071 | 2/1999 |

* cited by examiner

*Primary Examiner*—Edward Raymond
(74) *Attorney, Agent, or Firm*—Crowell & Moring LLP

(57) ABSTRACT

The invention relates to a speed filter for an internal combustion engine. Said filter contains a calculation rule (BV (i)), which is used to completely or partially eliminate a speed oscillation of the i-th order, thus improving the dynamics and the robustness of the speed control loop.

23 Claims, 5 Drawing Sheets

SPEED FILTER

CROSS-REFERENCE TO RELATED APPLICATIONS

This application claims the priority of German application 101 22 517.2, filed May 9, 2001, which was filed as International Application No. PCT/EP02/04922, on May 4, 2002, the disclosure of which is expressly incorporated by reference herein.

FIELD OF THE INVENTION

The invention relates to a speed filter for an internal combustion engine whose speed is detected in the form of the tooth timing of a shaft. The tooth timing values are used to determine a filtered tooth timing value by means of a speed filter, corresponding to the actual speed value.

BACKGROUND OF THE INVENTION

An internal combustion engine that is provided as a generator drive is conventionally supplied to the end user without a clutch and generator. The clutch and the generator are only mounted at the end customer's location. In order to ensure a consistent rated frequency for power supply into the network, the internal combustion engine is operated in a speed control loop. This detects the speed of the crankshaft as a controlled variable and compares it to a target engine speed, i.e., the reference variable. The resulting control deviation is converted by means of a speed regulator into a manipulated variable for the internal combustion engine, for example, an injection quantity. The problem with such a control loop is that torsional oscillations, which are superimposed on the controlled variable, can be reinforced by the speed regulator. Particularly critical are the low-pass oscillations caused by the internal combustion engine, for example, torsional vibrations of the 0.5 and $1^{st}$ order. When starting the drive system the amplitudes of the torsional oscillations can become so large due to reinforcement by the speed regulator that a limit speed is exceeded, and the internal combustion engine shuts off.

The instability problem is countered with a speed filter in the feedback path of the speed control loop. We are familiar with such a speed filter from EP 0 059 585 B1. There the tooth timing values of a shaft are detected by means of a working cycle of the internal combustion engine. The working cycle includes two revolutions of the crankshaft, corresponding to 720 degrees. These tooth timing values are then used to calculate a filtered tooth timing value by forming an arithmetic mean. It is updated after every working cycle. This filtered tooth timing value corresponds to the actual speed value, which is then used to regulate the internal combustion engine. The problem with this 2-revolution filter, however, is that a stable behavior of the drive system produces a worsening of the load acceptance behavior.

SUMMARY OF THE INVENTION

To this extent, object of optimizing the speed filter is the object of the invention.

This object is achieved with the features described herein.

In accordance with the invention, the speed filter includes a calculation rule with which the torsional vibration of the $i^{th}$ order is eliminated completely or at least in part. The torsional oscillation of the $0.5^{th}$ order, for example, is eliminated completely through a calculation rule that provides that the current tooth timing value is added to the tooth timing value of one revolution earlier. Contrary to the 2 revolution filter from the prior art, this results in the advantage that the actual speed value is already available at an earlier time. Speed detection is thus quicker compared to the prior art. In other words, the dynamics of the speed control loop are increased without endangering the stable behavior of the drive system. In order to minimize the influence of manufacturing tolerances of the odometers, it is provided in accordance with the invention that the tooth timing values are recorded at a specifiable angle of the shaft. Another measure that is provided is that the speed filter additionally includes a compensating member, further including a low pass filter and a differential member, for calculation of the filtered tooth timing value. By combining the invention with other transfer functions, e.g., average filters, new frequency responses can be created. The invention thus offers the overall advantage that the speed control loop is very robust with respect to disturbances, for example, temperature and manufacturing tolerance of the clutch. It is noted that resonance frequency of the drive system decreases at higher temperatures.

The disclosure herein includes:

A speed filter for an internal combustion engine whose speed is detected in the form of tooth timing values of a shaft and where from the tooth timing values by means of a filter a filtered tooth timing value, corresponding to the actual speed value, is calculated, characterized in that the speed filter comprises a calculation rule (BV(i), i=0.5, 1, 1.5, . . . ) for the complete or partial elimination of a torsional vibration of the $i^{th}$ order and by means of the calculation rule (BV(i)) the filtered tooth timing value (y(k), k=1,2,3 . . . ) is determined (y(k)=f(BV(i))) by adding a current tooth timing value (U(k)) and earlier tooth timing values (U(k−(N/2)), U(k−(N/3)).

A speed filter as described above, characterized in that the earlier tooth timing values (U(k−(N/2)), U(k−(N/3)) are weighted through evaluation factors (k1, k2, . . . ).

A speed filter as described above, characterized in that the filtered tooth timing value (y(k)) additionally is determined by means of a compensating member), wherein the input variable (y1(*k*)) of the compensating member corresponds to the output variable of the calculation rule (BV(i)).

A speed filter as described above, characterized in that the compensating member includes at least one differential member and preferably a low pass filter.

A speed filter as described above, characterized in that the torsional vibration of the $i^{th}$ order is completely eliminated by calculating the filtered tooth timing value (y1(k)) from the current tooth timing value (U(k)) and the tooth timing value 1/(2i) earlier by means of the calculation rule (BV(i)).

A speed filter as described above, characterized in that the calculation rule (BV(i)) is implemented in the following form:

$$y1(k)=y1(k-1)+(1/F)\,[U(k)+k1\,U(k-F)]$$

with
y1(k) current filtered tooth timing value
y1(k−1) filtered tooth timing value from 2/N revolutions earlier
N number of tooth timing values detected per working cycle
F N/(4i)
i order of the torsional vibration that is to be eliminated
U(k) current tooth timing value
U(k−F) tooth timing value 1/(2i) revolutions earlier
k1 evaluation factor; equal to one.

A speed filter as described above, characterized in that the torsional vibration of the $i^{th}$ order is partially eliminated by calculating the filtered tooth timing value (y1(k)) by means of the following calculation rule (BV(i)):

$$y1(k)=y1(k-1)+(1/F)\ [U/(k)+k1\ U(k-F)+\Sigma kj\ U(k-(N/(4i+(j-1))))]$$

with y1(k) current filtered tooth timing value
y1(k−1) filtered tooth timing value from 2/N revolutions earlier
N number of tooth timing values detected per working cycle
F N/4i
i order of the torsional vibration that is to be eliminated
U(k) current tooth timing value
U(k−F) tooth timing value 1/(2i) revolutions earlier
k1 evaluation factor; k1<1
j control variable j from 2 to ∞
kj evaluation factors A speed filter as described above, characterized in that the sum of the evaluation factors (k1, k2 . . . ) is set at one (k1+k2+ . . . =1).

A speed filter as described above, characterized in that the current tooth timing value (U(k)) and the earlier tooth timing values (U(k−(N/2)), U(k−(N/3)), . . . ) are averaged over a specifiable angle of the shaft.

A speed filter as described above, characterized in that the speed filter is combined with another filter, particularly a mean value filter.

A speed filter as described above, characterized in that the order i of the torsional oscillation that is supposed to be eliminated is set at a fixed value or is calculated through frequency analysis.

DETAILED DESCRIPTION OF THE INVENTION

Figure 1:
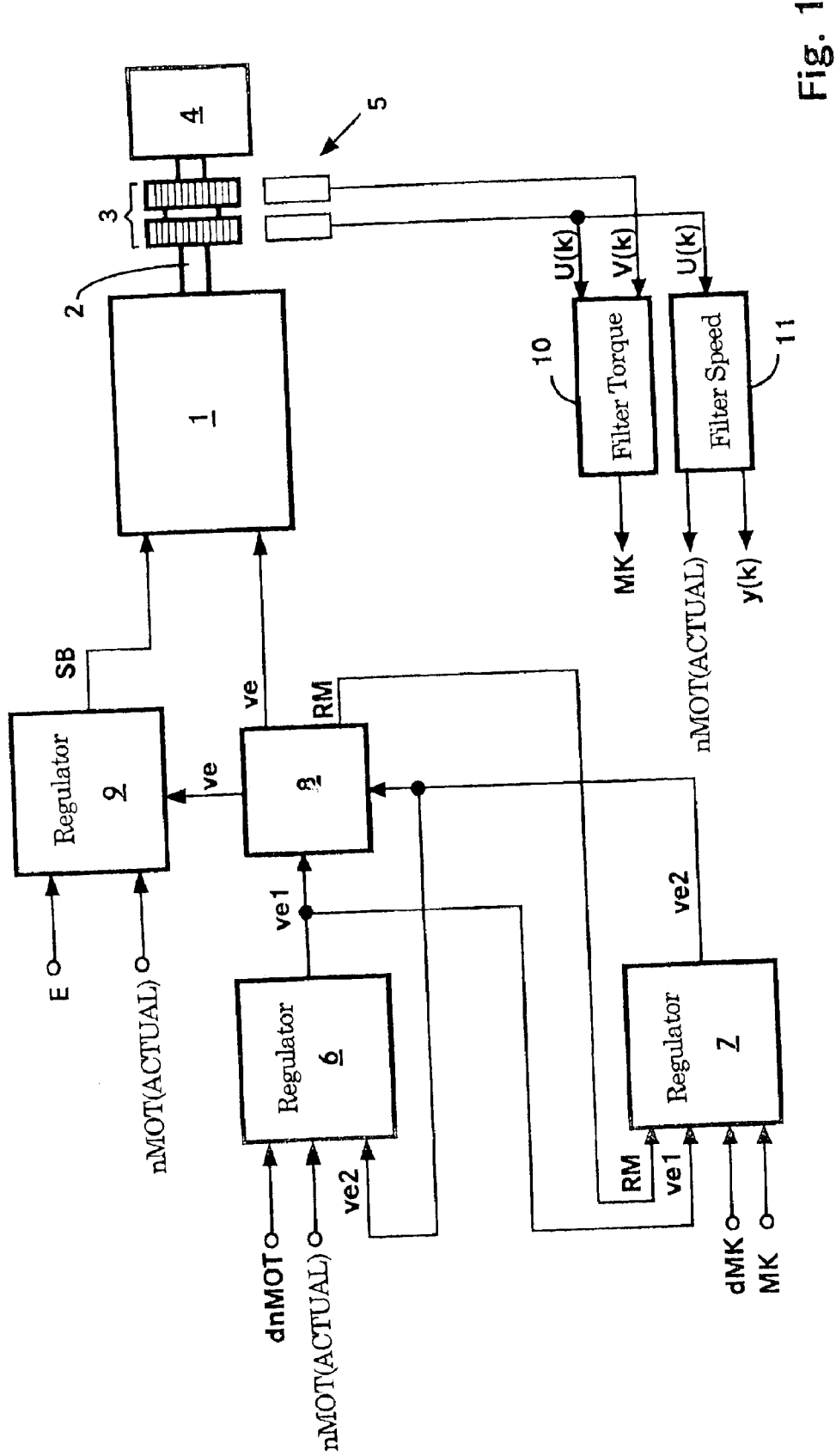
FIG. 1 Illustrates a block diagram
FIG. 2 Illustrates a speed-time diagram of a start process
FIG. 3 Illustrates a speed-time diagram
FIG. 4 Illustrates a block diagram of the filter
FIGS. 5, 7 Illustrate an amplitude-frequency diagram
FIGS. 6, 8 Illustrate a phase-frequency response-frequency diagram

FIG. 1 depicts a block diagram of the control system of the internal combustion engine 1 with coupled control loop structure. Represented are: a speed regulator 6, an engine torque regulator 7, a selecting device 8, an injection start regulator 9 and the internal combustion engine 1 with the injection system, for example, a common rail system. The internal combustion engine 1 drives an engine load 4, for example, a generator or a ship's propulsion, via the shaft 2. On the shaft 2 gear wheels 3 are arranged. The tooth timing values U(k) and V(k) of the gear wheels 3 are detected by the speed sensors 5. The current tooth timing value U(k) is used to calculate a filtered tooth timing value y(k) or accordingly an actual speed nMOT(ACTUAL) by means of a speed filter 11. The engine torque MK on the output of the internal combustion engine 1 is determined with the torque filter 10. The actual engine speed nMOT(ACTUAL) is used as an input variable for the speed regulator 6 and the injection start regulator 9 in this type of control loop structure.

The input variables of the speed regulator 6 are: the actual engine speed nMOT(ACTUAL), a speed difference dnMOT and a signal ve2. The speed difference dnMOT is calculated from the actual engine speed nMOT(ACTUAL) and a target engine speed nMOT(TARGET). The signal ve2 corresponds to the output signal of the engine torque regulator 7. The output variable of the speed regulator 6 is a signal ve1. This signal is passed to the selecting device 8 and the engine torque regulator 7. The input variables of the engine torque regulator 7 are: the engine torque MK, a differential torque dMK, the signal ve1 and a regulating mode RM. The differential torque dMK is calculated from the engine torque MK and a maximum permissible engine torque. The output signal of the engine torque regulator 7 is the signal ve2. This signal is directed at the selecting device 8 and the speed regulator 6. The selecting device 8 is used to establish which of the two regulators 6 or 7 is dominant, for example, by means of a minimum value selection of the two signals ve1 and ve2. The output signals of the selecting device 8 are a performance-determining signal ve and the regulating mode RM. The performance-determining signal ve is directed at the injection device of the internal combustion engine 1 and the injection start regulator 9.

By the performance-determining signal ve, the injection quantity or the control response of a control rod are to be understood.

The input variables of the injection start regulator 9 are: the actual engine speed nMOT(ACTUAL), the performance-determining signal ve supplied by the selecting device 8 and further input variables E, for example, the maximum combustion pressure value. The output variable of the injection start regulator 9 is the start of injection SB, which is passed on to the internal combustion engine 1. Since the interaction of the speed regulator 6 with the engine torque regulator 7 and the injection start regulator 9 is not relevant for understanding the invention, no additional details need to be provided.

The speed control loop includes, as shown in FIG. 1, of the following components: speed regulator 6, the internal combustion engine 1, speed sensors 5 for detecting the tooth timing values and a feedback path with the speed filter 11.

Figure 2:
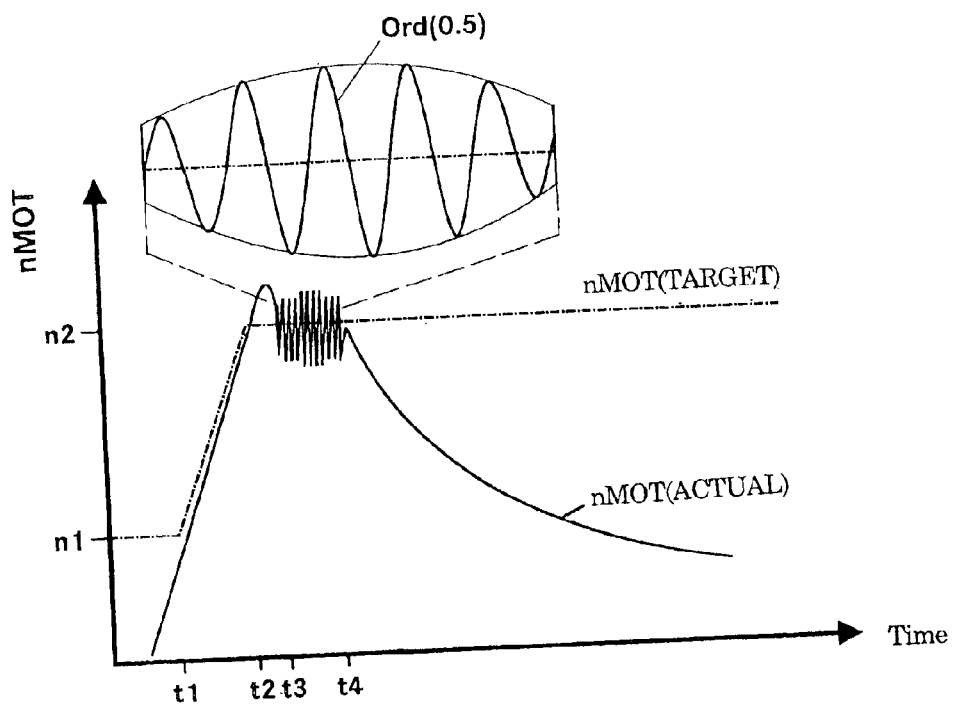

FIG. 2 shows a speed-time diagram for the start process of a drive unit, for example, an internal combustion engine with generator. The dash-dotted line represents the reference variable for speed control, corresponding to the target speed nMOT(TARGET). The solid line is the actual speed nMOT (ACTUAL). At the time t1 the reference variable is increased from a starting value n1 to the value n2 until time t2 in a ramp-like manner. From time t2 on the reference variable remains unchanged. The actual speed nMOT (ACTUAL) initially follows this reference variable. From time t2 on, however the actual speed nMOT(ACTUAL) exceeds the specified value n2. During the time t3 through t4, the actual speed nMOT(ACTUAL) of the internal combustion engine begins to oscillate. The causes for these speed oscillations can be: an impermissibly high dispersion of the injectors, the failure of one injector and/or a defective coordination of the entire system. In these torsional vibrations, the $0.5^{th}$ order has proven to be particularly dominant. This is shown in FIG. 2 in a sectional view. In practice, the amplitudes in an internal combustion engine with an operating temperature in part become so great that a speed limit is exceeded and an emergency stop is triggered. This results in the actual speed curve after the time t4.

Figure 3:
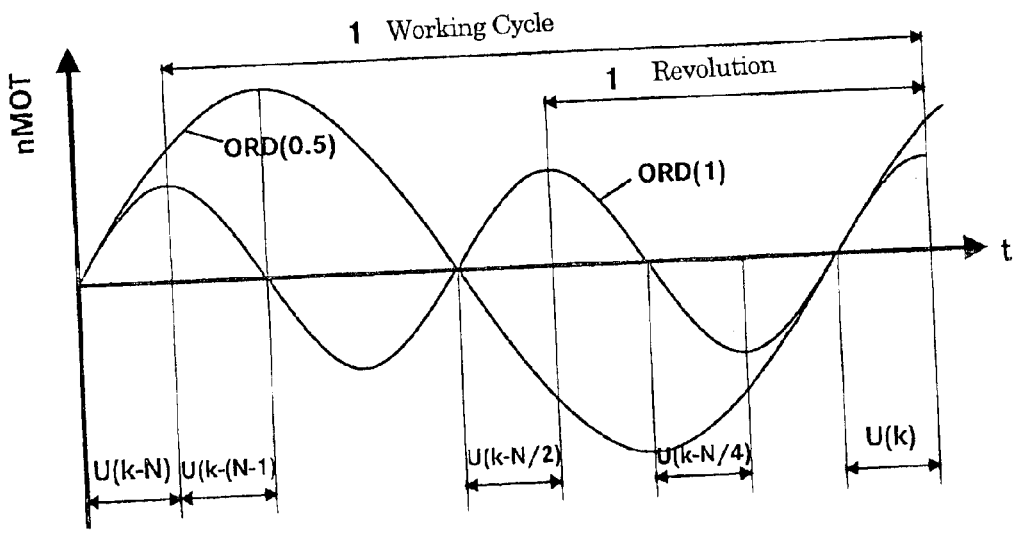

FIG. 3 shows the curve of speed nMOT on the crankshaft over time. Two torsional vibrations, corresponding to the $0.5^{th}$ and $1^{st}$ orders during a working cycle, i.e. 720 degrees of the crankshaft of the internal combustion engine are represented. In FIG. 3, 5 tooth timing values are shown in an exemplary fashion: U(k−N), U (k−(N−1)), U (k−N/2), U (k−N/4) and U(k). The parameter N here characterizes the number of tooth timing values detected per working cycle. U(k) designates the current tooth timing value. Tooth timing is the duration between a first impulse and a second impulse or between several consecutive impulses of the gear wheels 3. In practice the spacing angle between two teeth can be, e.g., 3 degrees. This means that a maximum of 240 tooth timing values are detected for one working cycle of the internal combustion engine. Typically, the tooth timing values are stored in a circular buffer.

Figure 4:
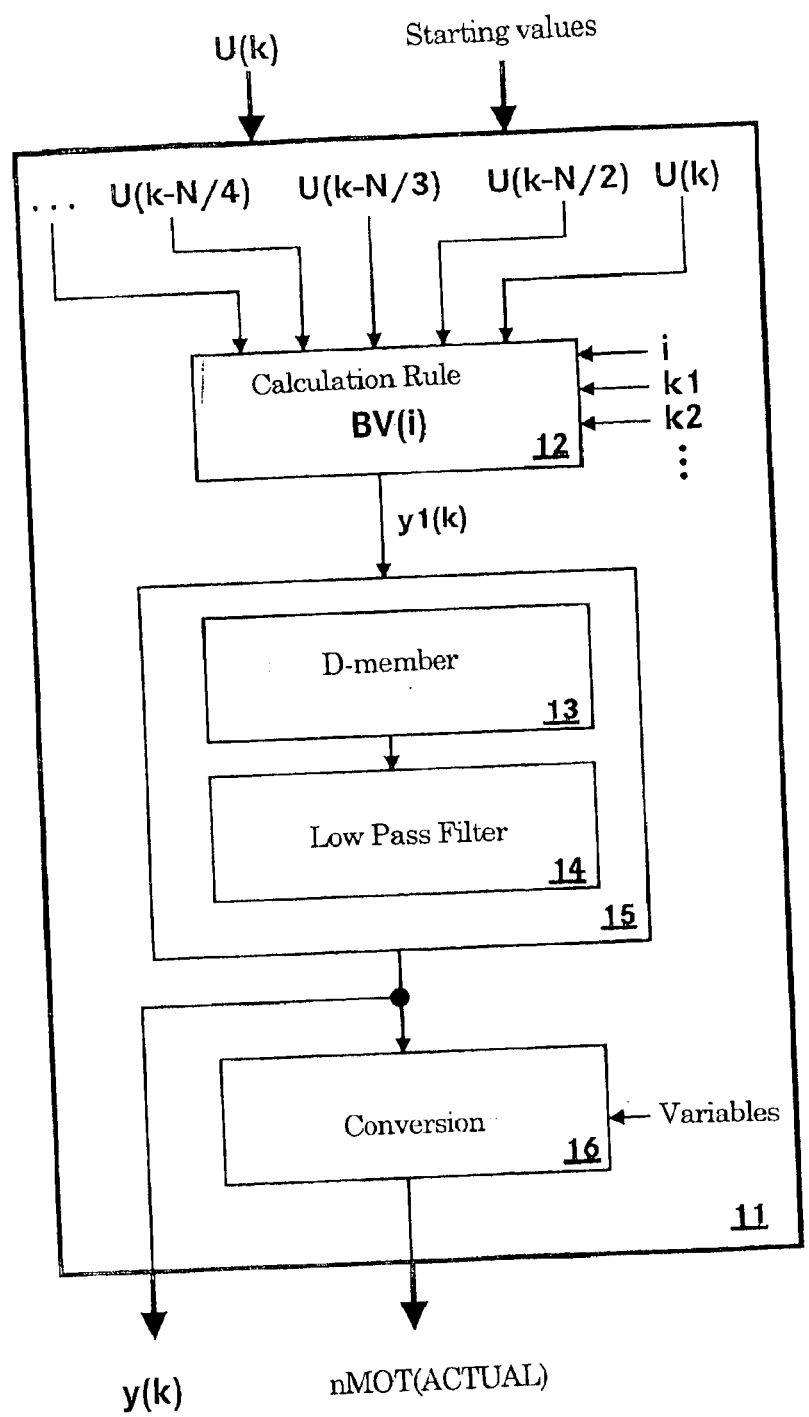

It becomes apparent on the basis of FIG. 3 that with the addition of the current tooth timing value U(k) to the tooth timing value of one revolution earlier U(k−N/2), the torsional vibration of the $0.5^{th}$ order can be eliminated. The torsional vibration of the $1^{st}$ order can be eliminated completely by adding the current tooth timing value U(k) to the tooth timing value of a half revolution earlier U(k−N/4). The corresponding mathematical conversion into a calculation rule BV(i) for the complete elimination of torsional oscillation of the $i^{th}$ order is as follows:

$$y1(k)=y1(k-1)+(1/F)\,[(U(k)+k1\ U(k-F)]$$

wherein
y1(k) current filtered tooth timing value
y1(k−1) filtered tooth timing value 2/N revolutions earlier
N number of tooth timing values detected per working cycle
F N/(4i)
i order of torsional vibration to be eliminated
U(k) current tooth timing value
U(k−F) tooth timing value 1/(2i) revolutions back
k1 evaluation factor, value equals one FIG. 4 shows a block diagram of the speed filter 11. The input variables are the tooth timing values U(k). These tooth timing values U(k) correspond to the tooth timing values detected over 2/N crankshaft revolutions. The output variable is a filtered tooth timing value y(k), alternatively the actual speed nMOT(ACTUAL). The tooth timing values U(k), U(k−(N/2)), etc., represent the input variable for a function block calculation rule BV(i), reference number 12. A tooth timing value y1(k) is determined with calculation rule BV(I), which no longer contains the torsional vibration of the $i^{th}$ order. Since due to the addition of tooth timing values, the calculation rule BV(i) represents an unstable algorithm (integral behavior), the algorithm is stabilized by adding a subsequent compensating member 15. The compensating member 15 here includes at least one differential transfer member (D-member). A low pass filter 14 can be arranged thereafter. Mathematically this means that the transfer functions of the calculation rule BV(i), of the differential member 13 and the low pass filter 14 are multiplied with each other. The filtered tooth timing value y(k) represents the output variable of the compensating member 15. By means of the function block 16, it is converted into the motor speed nMOT(ACTUAL).

The discrete transfer function G(z) of the speed filter can be described as follows:

$$G(z)=y(z)/U(z)$$

wherein $$z=e\ Exp(sTa)$$

Here the following applies:
Ta scanning time of the filter algorithm
y(z) z-transformed filtered tooth timing value y(k)
U(z) z-transformed unfiltered tooth timing value U(k)

Figure 5:
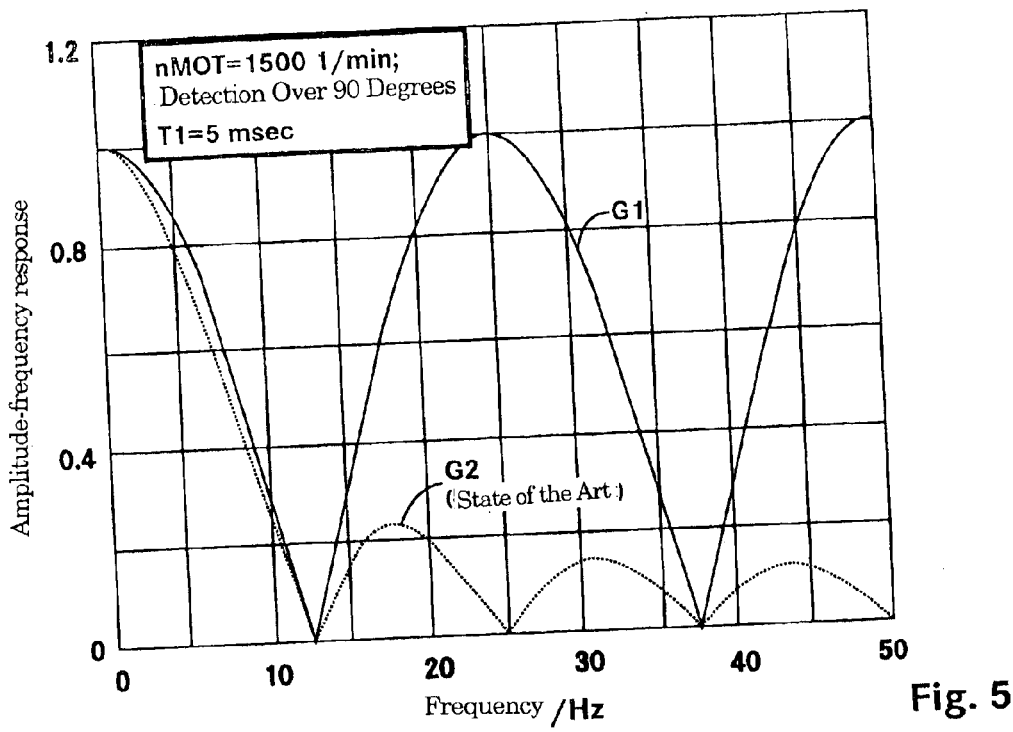
Figure 6:
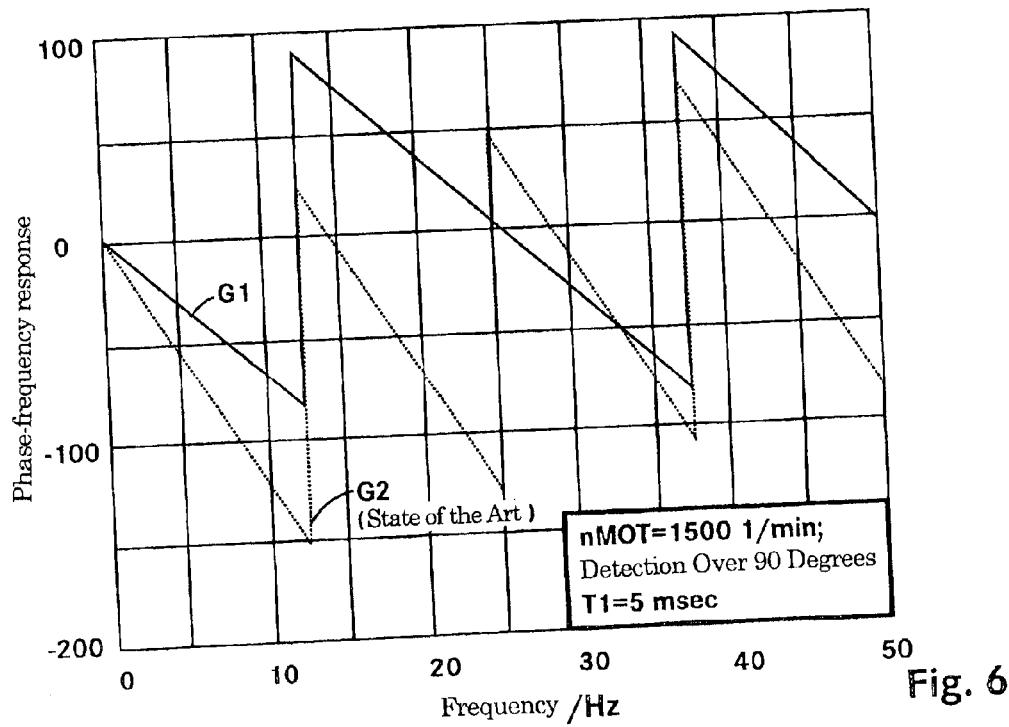

FIGS. 5 and 6 represent both the amplitude-frequency response (FIG. 5) and the phase-frequency response (FIG. 6) of a first transfer function G1 for the stationary engine speed 1500 RPM. A PT1 member with a time constant T1 of 5 msec was used as the low pass filter, and the tooth timing values were detected over a crankshaft angle of 90 degrees. One recognizes that the torsional vibration of $0.5^{th}$ order (12.5 Hz) has been eliminated completely.

In FIGS. 5 and 6, the amplitude and phase-frequency responses of the 2-revolution filter from the prior art are additionally depicted as transfer function G2. One can see that the transfer function G1 exhibits the considerably more favorable phase-frequency response, i.e., that the 2-revolution filter has a considerably larger phase delay.

If the torsional vibration of $0.5^{th}$ order and the torsional vibration of $1^{st}$ order are supposed to be eliminated partially, the calculation rule BV(i) is executed as follows:

$$y1(k)=y1(k-1)+(1/(N/2))[U/(k)+k1\ U(k-(N/2))+k2\ U(k-(N/4))]$$

wherein
y1(k) current filtered tooth timing value
y(k−1) filtered tooth timing value from 2/N revolutions earlier
N number of tooth timing values detected per working cycle
U(k) current tooth timing value
U(k−(N/2)) tooth timing value 1 revolution earlier
U(k−(N/4)) tooth timing value 0.5 revolution earlier
k1, k2 evaluation factors; k1+k2=1
Typical values are 0.8 for k1 and 0.2 for k2.

Figure 7:
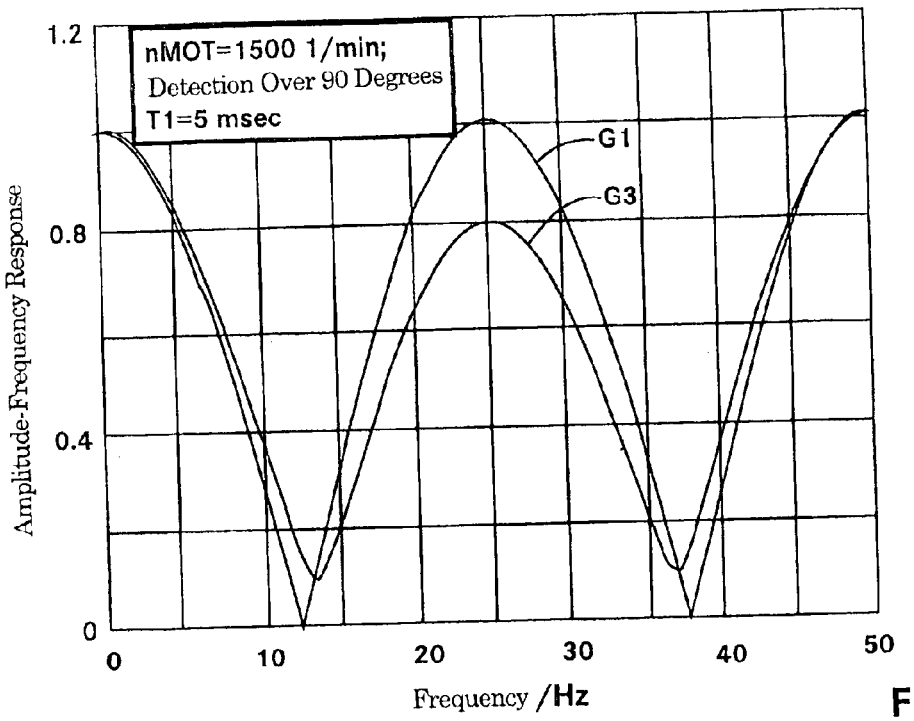
Figure 8:
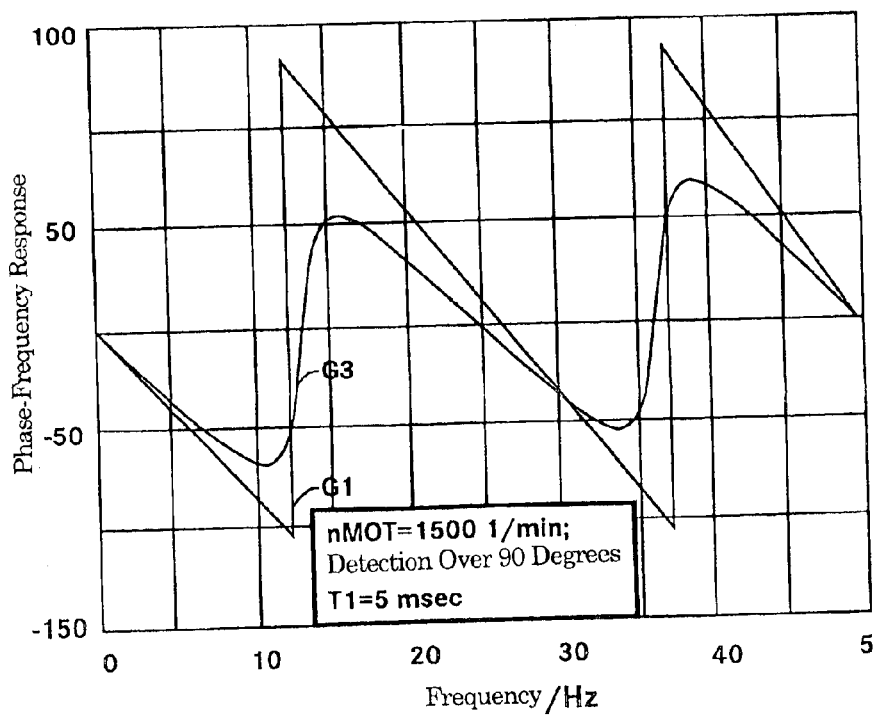

If again a filter of the 1st order (PT1 member) with the time constant 5 msec is used in this example as the low pass filter and the tooth timing values are recorded over 90 degrees, it results in the amplitude and phase-frequency responses depicted in FIGS. 7 and 8 (transfer function G3). One recognizes that the torsional oscillation of the $0.5^{th}$ order (12.5 Hz) is now no longer eliminated completely. Instead the torsional oscillation of the $1^{st}$ order is dampened more strongly (25 Hz). A comparison of the phase-frequency responses of transfer functions G1 and G3 shows that the transfer function G3 exhibits a lesser phase angle rotation than the transfer function G1.

As represented, the invention makes it possible to filter out torsional vibrations of any random order with less phase delay than with the corresponding 2-revolution filter or mean value filter from the state of the art. This leads to increased stability and better dynamics of the speed control loop. Since the invention comprises tooth timing value detection over a specified angle, influences of manufacturing tolerances can be minimized. When the transfer functions of the invention are combined with other transfer functions, e.g., mean value filters, new frequency responses can be created. The invention also allows additionally for any random number of tooth timing values in the past to be included. The sum of the individual evaluation factors k1, k2 . . . must equal 1, respectively.

In a drive system with soft clutches, this results in a low-pass resonance frequency of the system. If the resonance frequency is in the range of the torsional vibration of the $0.5^{th}$ order, the speed control loop can become unstable. However if the described speed filter is used, in the range of torsional oscillation of the $0.5^{th}$ order a very large dampening effect takes place, which has a stabilizing effect onto the overall control loop. The invention thus enables greater robustness of the speed control loop since most drive systems have a resonance frequency of less than 20 Hz. Greater robustness is achieved particularly towards temperature influences since the resonance frequency of the drive system becomes smaller at higher temperatures. Also with regard to manufacturing tolerances of the clutch (spring constant C, dampening) greater robustness is accomplished. In general the speed filter can always be used when point-symmetric periodic disturbances are supposed to be eliminated and/or dampened.

The going disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A speed filter for an internal combustion engine whose speed is detected in a form of tooth timing values of a shaft and where from the tooth timing values by means of a filter a filtered tooth timing value, corresponding to an actual speed value, is calculated, comprising:

a calculation rule for the complete elimination of a torsional vibration or partial elimination of said torsional vibration of the $i^{th}$ order;

wherein, by means of the calculation rule (BV(i)) certain tooth timing values are selected from earlier tooth timing-values (U(k−(N/2)), U(k−(N/3))) and the filtered tooth timing value (y(k), k=1,2,3 . . . ) is calculated (y(k)=f(BV(i))) by adding a current tooth timing value (U(k)) and the selected earlier tooth timing values.

2. The speed filter of claim 1, wherein the earlier tooth timing values (U(k−(N/2)), U(k−(N/3)) are weighted through evaluation factors (k1, k2, . . . ).

3. The speed filter of claim 1, wherein the filtered tooth timing value (y(k)) additionally is determined by means of a compensating member, wherein an input variable (y1(k)) of the compensating member corresponds to an output variable of the calculation rule (BV(i)).

4. The speed filter of claim 3, wherein the compensating member includes at least one differential member and may include a low pass filter.

5. The speed filter of claim 3, wherein the torsional vibration of the $i^{th}$ order is completely eliminated by calculating the filtered tooth timing value (y1(k)) from the current tooth timing value (U(k)) and the tooth timing value 1/(2i) earlier by means of the first calculation rule (BV(i)).

6. The speed filter of claim 5, wherein the calculation rule (BV(i)) is executed in the following form:

$$y1(k)=y1(k-1)+(1/F)\,[U(k)+k1\,U(k-F)],$$

with, y1(k) being said current filtered tooth timing value, y1(k−1) being a filtered tooth timing value from 2/N revolutions earlier, N being a number of tooth timing values detected per working cycle, F being N/(4i), i being the order of the torsional vibration that is to be eliminated, U(k) being said current tooth timing value, U(k−F) being a tooth timing value 1/(2i) revolutions earlier, and k1 being an evaluation factor equal to one.

7. The speed filter of claim 3, wherein the torsional vibration of the $i^{th}$ order is partially eliminated by calculating the filtered tooth timing value (y1(k)) as follows by means of the calculation rule (BV(i)):

$$y1(k)=y1(k-1)+(1/F)\,[U/(k)+k1\,U(k-F)+\Sigma kj\,U(k-(N/(4i+(j-1))))],$$

with, y1(k) being said current filtered tooth timing value, y1(k−1) being a filtered tooth timing value from 2/N revolutions earlier, N being a number of tooth timing values detected per working cycle, F being N/4i, i being the order of the torsional vibration that is to be eliminated, U(k) being said current tooth timing value, U(k−F) being a tooth timing value 1/(2i) revolutions earlier, k1 being an evaluation factor, where k1<1, j being a control variable from 2 to ∞, and kj being evaluation factors.

8. The speed filter of claim 7, wherein the sum of the evaluation factors (k1, k2 . . . ) is set at the value one (k1+k2+ . . . =1).

9. The speed filter of claim 5, wherein the current tooth timing value (U(k)) and the earlier tooth timing values (U(k−(N/2)), U(k−(N/3)), . . . ) are averaged over a specifiable angle of the shaft.

10. The speed filter of claim 1, wherein the filtered tooth timing value (y1(k)) is filtered with another filter, particularly an average filter.

11. The speed filter of claim 1, wherein the order i of the torsional oscillation that is supposed to be eliminated is set at a fixed value or is calculated through frequency analysis.

12. A speed filter for an internal combustion engine, a speed of said engine being detected in a form of tooth timing values of a shaft, comprising:

a calculation rule for complete elimination of a torsional vibration and/or partial elimination of an $i^{th}$ order of said torsional vibration;

wherein a filtered tooth timing value is calculated from said tooth timing value by said calculation rule.

13. The speed filter of claim 12, wherein said calculation rule adds a current tooth timing value to selected earlier tooth timing values to generate said filtered tooth timing value.

14. The speed filter of claim 13, wherein said selected earlier tooth timing values are weighted through a plurality of evaluation factors.

15. The speed filter of claim 13, wherein said filtered tooth timing value is further determined by a compensating member, an input variable of said compensating member corresponding to an output variable of said calculation rule.

16. The speed filter of claim 15, wherein the compensating member includes at least one differential member.

17. The speed filter of claim 16, wherein the compensating member includes a low pass filter.

18. The speed filter of claim 17, wherein the torsional vibration of the $i^{th}$ order is completely eliminated by calculating said filtered tooth timing from said current tooth timing value and a tooth timing value 1/(2i) earlier.

19. The speed filter of claim 18, wherein the calculation rule is executed in the following form:

$$y1(k)=y1(k-1)+(1/F)\,[U(k)+k1\,U(k-F)],$$

wherein y1(k) is a current filtered tooth timing value, y1(k−1) is a filtered tooth timing value from 2/N revolutions earlier, N is a number of tooth timing values detected per working cycle, F is N/(4i), i is the order of the torsional vibration that is to be eliminated, U(k) is said current tooth timing value, U(k−F) is said tooth timing value 1/(2i) revolutions earlier, and k1 is an evaluation factor, where k1 is equal to one.

20. The speed filter of claim 15, wherein said torsional vibration of the $i^{th}$ order is partially eliminated by calculating said filtered tooth timing value in the following form:

$$y1(k)=y1(k-1)+(1/F)\ [U/(k)+k1\ U(k-F)+\Sigma kj\ U(k(N/(4i+(j-1))))],$$

wherein y1(k) is said current filtered tooth timing value, y1(k−1) is a filtered tooth timing value from 2/N revolutions earlier, N is a number of tooth timing values detected per working cycle, F is N/4i, i is the order of the torsional vibration that is to be eliminated, U(k) is said current tooth timing value, U(k−F) is a tooth timing value 1/(2i) revolutions earlier, k1 is an evaluation factor, where k1<1, j is a control variable ranging from 2 to ∞, and kj are evaluation factors.

21. The speed filter of claim 20, wherein a sum of evaluation factors kj equals one.

22. The speed filter of claim 19, wherein said current tooth timing value and earlier tooth timing values are averaged over a specifiable angle of said shaft.

23. The speed filter of claim 20, wherein said current tooth timing value and earlier tooth timing values are averaged over a specifiable angle of said shaft.

* * * * *